(No Model.)
J. M. GARVERICK.
CAR AXLE.
No. 303,634. Patented Aug. 19, 1884.
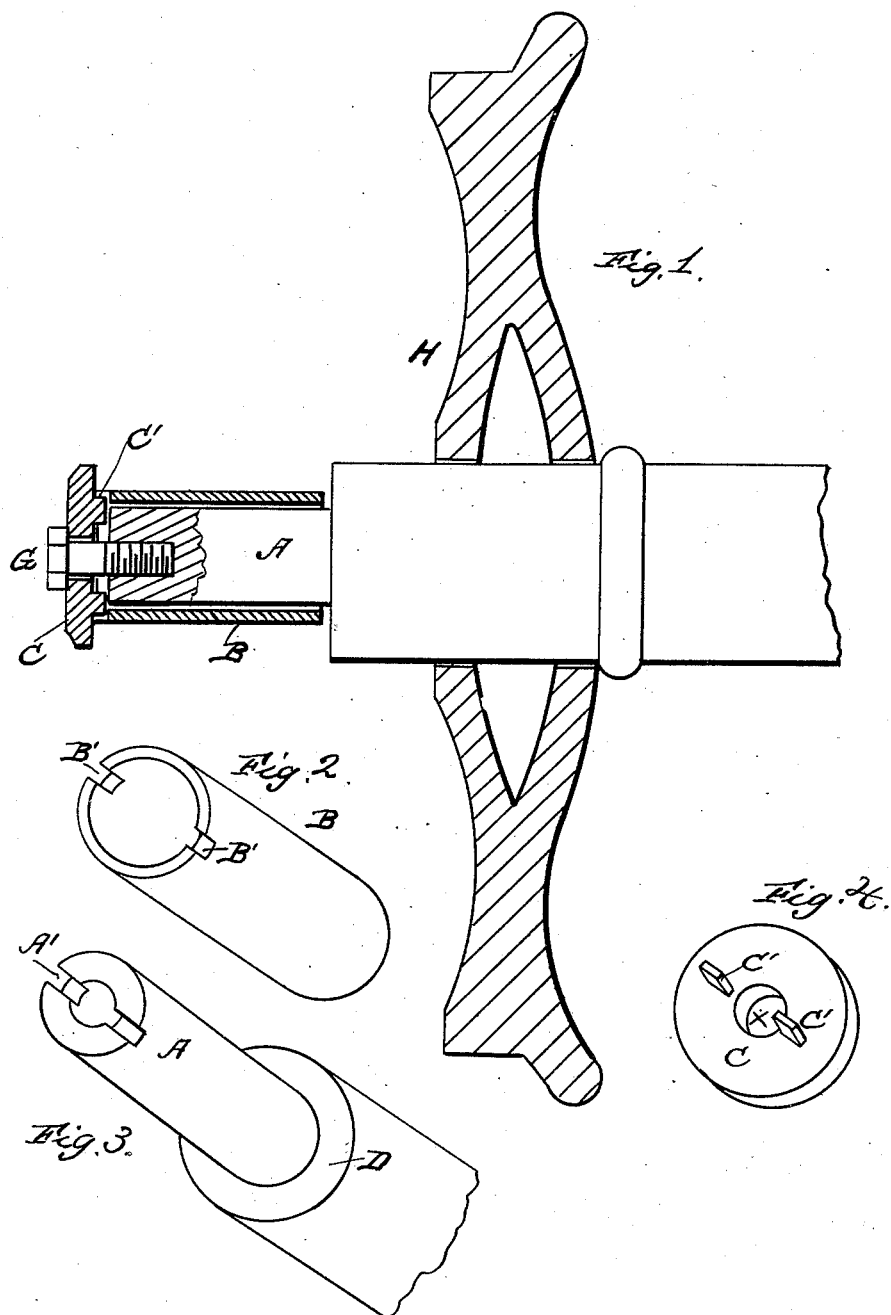
WITNESSES
INVENTOR
John M. Garverick
By Theophilus Weaver
his ATTORNEY

UNITED STATES PATENT OFFICE.

JOHN M. GARVERICK, OF HARRISBURG, PENNSYLVANIA, ASSIGNOR OF ONE-HALF TO GEORGE RUNK, OF SAME PLACE.

CAR-AXLE.

SPECIFICATION forming part of Letters Patent No. 303,634, dated August 19, 1884.

Application filed May 22, 1884. (No model.)

*To all whom it may concern:*

Be it known that I, JOHN M. GARVERICK, a citizen of the United States, residing at Harrisburg, in the county of Dauphin and State of Pennsylvania, have invented certain new and useful Improvements in Perpetual Journals for Car-Axles, &c.; and I do hereby declare that the following, in connection with the accompanying drawings, is a full, clear, and accurate description of the invention, which will enable persons skilled in the arts to which it appertains to make and use the same.

In the accompanying drawings, Figure 1 is a view of a car-axle with car-wheel thereon, and the journal shown in vertical section. Fig. 2 represents my journal-bushing. Fig. 3 represents my journal wrist on axle. Fig. 4 represents my interlocking key-plate, the last three figures being perspective views.

Throughout drawings and description like letters denote like parts and portions.

I will explain, for showing the object of my invention, that in car-axles, as now usually made, the journals are liable to wear out first, and when this occurs it costs from twenty to thirty dollars to supply the wheels with a new axle, and necessitates delay to make the repairs. The journals, when new, are usually about three and a half inches in diameter, and when reduced by wear to about three inches in diameter, they are at the minimum of strength allowable for safe rolling-stock. Moreover, as the diameter of the journal diminishes the tendency to cut the brass bearing thereby increases; consequently heating of the journal and its bearing often occurs as the cutting or rapid wear occurs. Engineers are agreed that, within a certain limit, larger journals are less liable to heat from wear than lesser ones; also, that a steel journal is better in point of friction than one of iron of same size.

My improvement aims to avoid the loss of the axle or its reduction beyond the minimum size required for strength by clothing the wrist or the body of the journal, before said limit of wear is reached, with a steel bushing to restore the journal to the maximum wearing-surface; also, to apply the said bushing to new journals of axles, that when worn the journal surface and size may be readily restored, and in all cases to secure the bushing to the journal-wrist removably, yet firmly or positively locked therewith, to have a common motion therewith. I thus retain the tenacity of the iron axle and wrist integrally, and make the journal-wrist steel-clad to perpetuate its life.

The novel and useful features of my invention are, first, the combination with a journal-wrist provided with squarely-shouldered sustaining part integral therewith, of a cylindrical bushing of uniform bore, and adapted to be sleeved on said wrist, and having on its outer end a transverse key-seat corresponding with like key-seat on the outer end of said wrist, and of removable end plate provided with keys or bits adapted to fit in said key-seats to interlock the parts against turning upon each other, said plate being secured in position by bolt or set-screw adapted to firmly jam it on said bushing and the latter on said shoulder; second, the combination of bushing of uniform cylindrical form with journal-wrist of same form, and having unreduced shoulder at inner end thereof, and interlocking plate secured on outer ends of said bushing and wrist, and having radial detents for engaging radial seats in said ends.

In the description by letter, A denotes the journal-wrist, formed integral with the axle or shoulder D. Car-axles are made with such shoulders thereon of diameter about one inch greater than that of the journal-wrist. Said shoulders abut against the brass bearings in the boxes and take the lateral strain, so that little stress occurs on the button on outer end of journal. In place of said button I apply a removable key-plate, C, to outer end of the journal-wrist A, which is secured thereto by screw G or by equivalent means. The "journal-wrist" A is so termed because it is only a stud or holder for the part B, termed the "bushing," which latter is the journal-surface or part which encounters or wears, and is therefore preferably made of steel. The wrist A is clad with said steel bushing B, that it may with it have maximum size required to work well without heating the box or bearing, and that when the bushing is worn out the journal-wrist may be refitted readily with a new bushing. The outer end of wrist A is provided with the radial or transverse slot A' A', and the bushing B has its outer end provided with a corresponding transverse slot, B' B', and the plate C is provided with the bits or keys C' C' on its inner face, adapted to fit in said slots in manner as shown in Fig. 1. The bits or portions C' C' lap the joint in said slots where the wrist A and bushing B meet. The same are therefore interlocked by said bits. The said bits are set inward a little from the outer surface of the bushing B, to a limit where said surface will be when in its last stage of wear. It is designed to make said bushing and key-plate steel castings. The bushings can then be quickly reamed out and trued up to refit the abraded journals. The bushing is kept from turning to confine the wear of the parts to the outer surface thereof. The journal-wrist is therefore not worn, and is in this regard perpetual.

Although, for the sake of illustration of my invention, a car-axle journal has been shown in this application, it is evident that the wrist-pins of locomotives may be steel clad in the same way, and journals in many other kinds of machinery may be improved or their lives enhanced in the same way. I therefore do not confine my improvement to car-axle journals only.

I claim—

1. The combination of sustaining part D, integral with journal-wrist A, the steel bushing B, sleeved on said wrist, both having the corresponding key-seats, A' and B', respectively, in their outer ends, the removable plate C, provided with keys or bits C', adapted to fit in said key-seats, and the securing-bolt or retainer G, for holding said parts interlocked, substantially as and for the purposes set forth.

2. In a car-axle, the combination, with stem or sustaining part D, forming a square shoulder at and integral with wrist or reduced part A, of the axle, of a cylindrical bushing B, fitted to said wrist accurately, of transverse key-seats A' and B' in the outer ends of said wrist and bushing, respectively, and of plate C, having lugs or bits on its inner face adapted to fit into said key-seats, and a central eye through which bolt G extends or is entered into center of wrist, and jams said bushing against said shoulder and keeps the same interlocked with the wrist, substantially as and for the purpose set forth.

JOHN M. GARVERICK.

In presence of—
EUGENE SNYDER,
GEORGE RUNK.